(12) United States Patent
Berthaud et al.

(10) Patent No.: US 9,268,975 B2
(45) Date of Patent: Feb. 23, 2016

(54) CONTACTLESS PLASTIC CARD ENCODING MODULE

(71) Applicant: EVOLIS, Beaucouze (FR)

(72) Inventors: Emmanuel Berthaud, Beaucouze (FR); Benoit Letard, Beaucouze (FR)

(73) Assignee: EVOLIS, Beaucouze (FR)

( * ) Notice: Subject to any disclaimer, the term of this patent is extended or adjusted under 35 U.S.C. 154(b) by 0 days.

(21) Appl. No.: 14/352,898

(22) PCT Filed: Oct. 15, 2012

(86) PCT No.: PCT/EP2012/070432
§ 371 (c)(1),
(2) Date: Apr. 18, 2014

(87) PCT Pub. No.: WO2013/057076
PCT Pub. Date: Apr. 25, 2013

(65) Prior Publication Data
US 2014/0306018 A1 Oct. 16, 2014

(30) Foreign Application Priority Data
Oct. 19, 2011 (FR) .................................... 11 59418

(51) Int. Cl.
| G06K 19/06 | (2006.01) |
| G06K 1/12 | (2006.01) |
| G06K 17/00 | (2006.01) |
| B41J 3/46 | (2006.01) |
| B41J 13/12 | (2006.01) |

(52) U.S. Cl.
CPC ... *G06K 1/12* (2013.01); *B41J 3/46* (2013.01); *B41J 13/12* (2013.01); *G06K 17/0025* (2013.01)

(58) Field of Classification Search
CPC ................ G06K 2017/0041; G06K 19/07716; B41J 13/12; B65H 2701/1914; B65H 5/04
USPC ........................................................ 235/492
See application file for complete search history.

(56) References Cited

U.S. PATENT DOCUMENTS

| RE40,269 E * | 4/2008 | Mochizuki et al. ............ 347/222 |
| 2001/0048028 A1 * | 12/2001 | Sasaki et al. .................. 235/451 |
| 2002/0036376 A1 * | 3/2002 | Yui ................................. 271/83 |

(Continued)

FOREIGN PATENT DOCUMENTS

EP          2 179 931          4/2010

OTHER PUBLICATIONS

International Search Report for PCT/EP2012/070432 mailed Jan. 3, 2013.

(Continued)

*Primary Examiner* — Thien M Le
*Assistant Examiner* — Claude J Brown
(74) *Attorney, Agent, or Firm* — Nixon & Vanderhye, PC

(57) ABSTRACT

A contactless plastic-card encoding module (2) mounted on the frame of a plastic-card printer (1), the module comprising:
an electronic card (23) that fulfills the function of plastic-card encoding,
a hollow support (21) comprising fixations (211) for fixing the support to the frame of the printer,
a piece (22) absorbing any reliefs on the electronic card, the piece (22) being positioned at the bottom of the hollow support (21) and receiving the electronic card (23), and
a holder (24) for holding the electronic card in position on the piece.

3 Claims, 2 Drawing Sheets

(56) References Cited

U.S. PATENT DOCUMENTS

| | | | |
|---|---|---|---|
| 2002/0101498 A1* | 8/2002 | Vuong et al. | 347/171 |
| 2003/0197056 A1* | 10/2003 | Dunham et al. | 235/380 |
| 2004/0114981 A1* | 6/2004 | Meier et al. | 400/208 |
| 2005/0053406 A1* | 3/2005 | Jones et al. | 400/120.01 |
| 2005/0140769 A1* | 6/2005 | Kanemaru et al. | 347/172 |
| 2006/0001526 A1 | 1/2006 | Murofushi et al. | |
| 2010/0103238 A1 | 4/2010 | Neuhard et al. | |
| 2010/0207838 A1* | 8/2010 | Chiu et al. | 343/873 |
| 2010/0289845 A1* | 11/2010 | Conway et al. | 347/16 |
| 2010/0328713 A1* | 12/2010 | Hilbert et al. | 358/1.15 |

OTHER PUBLICATIONS

Written Opinion of the International Searching Authority for PCT/EP2012/070432 mailed Jan. 3, 2013.

* cited by examiner

CONTACTLESS PLASTIC CARD ENCODING MODULE

This application is the U.S. national phase of International Application No. PCT/EP2012/070432 filed 15 Oct. 2012 which designated the U.S. and claims priority to FR 11/59418 filed 19 Oct. 2011, the entire contents of each of which are hereby incorporated by reference.

The present invention concerns a contactless plastic-card encoding module intended to be mounted on the frame of a plastic-card printer.

Printers are known that provide the contactless encoding of magnetic stripes and/or chips present on a plastic card. For this purpose, these printers comprise a contactless encoding module that comprises a support, normally fixed to the frame of the printer, and an electronic card positioned on this support. The dimensions of the support are then suited to those of the electronic card for which this support can receive this electronic card and hold it in position.

The contactless encoding module is normally connected by a cable to another module, also mounted on the printer and normally referred to as a coupler. This coupler then supplies to the contactless encoding module the data to be encoded on a plastic card then present in the printer. The electronic card of the encoding module, which also fulfils the function of an RFID antenna, then encodes these data on a chip of this plastic card.

The dimensions of electronic cards vary from one manufacturer to another and it is then imperative to design recesses on the frame of the printer and supports that are specific to each of these cards, that is to say it is necessary to design a particular encoding module for each type of electronic card.

The problem addressed by the present invention is making the contactless encoding module universal, that is to say designing a contactless encoding module that can receive any type of contactless data-encoding electronic card.

To this end, the present invention concerns a contactless plastic-card encoding module that is intended to be mounted on the frame of a plastic-card printer, said module comprising an electronic card that fulfils the function of plastic-card encoding, the module is characterised in that it comprises:
- a hollow support comprising means for fixing this support to the frame of the printer,
- a means made from flexible material intended to be positioned at the bottom of the hollow support and to receive the electronic card, and
- a means for holding the electronic card in position on the means made from flexible material.

The technical problem is solved by the combination of the hollow support, the means made from flexible material and the holding means. This is because the hollow support houses the means made from flexible material, the means made from flexible material absorbs any reliefs on the electronic card caused, for example, by components situated on one of the faces thereof, and the holding means presses the electronic card against the flexible means even if the dimensions of this card vary (within the limits, of course, of the dimensions of the support). The encoding module according to the present invention can therefore receive several types of electronic card without changing its support or its means for holding the electronic card in position.

According to one embodiment, the holding means is an elastic the ends of which are gripped in lugs that are secured to the support.

This embodiment is simple and inexpensive. It also enables the card to be held securely in position, which is essential during the use of this module for encoding data on a plastic card.

The features of the invention mentioned above, as well as others, will emerge more clearly from a reading of the following description of an example embodiment, said description being given in relation to the accompanying drawings, among which:

Figure 1:
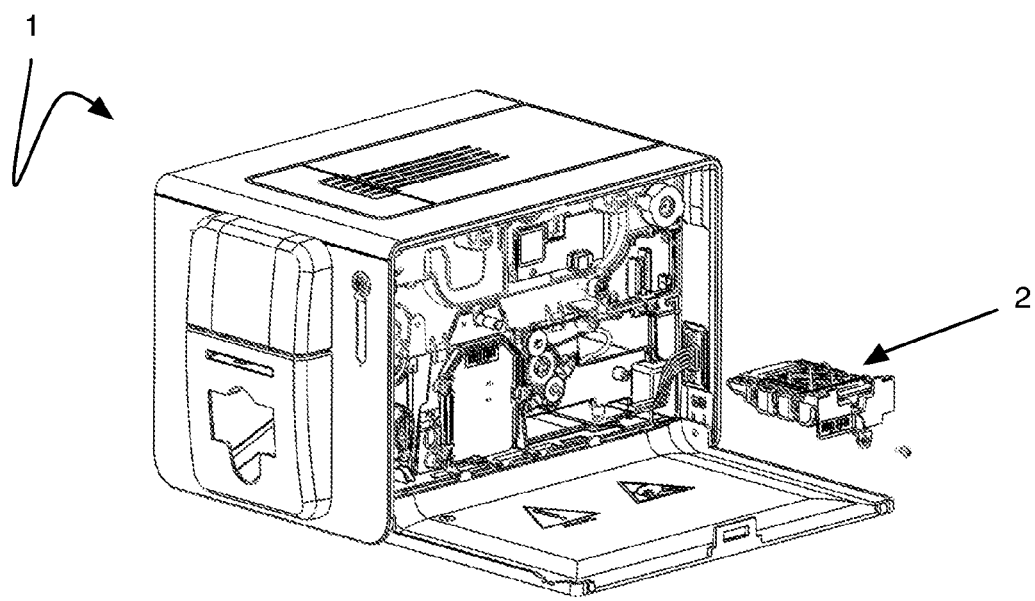
FIG. 1 shows a perspective view of a plastic-card printer according to the present invention.
Figure 2:
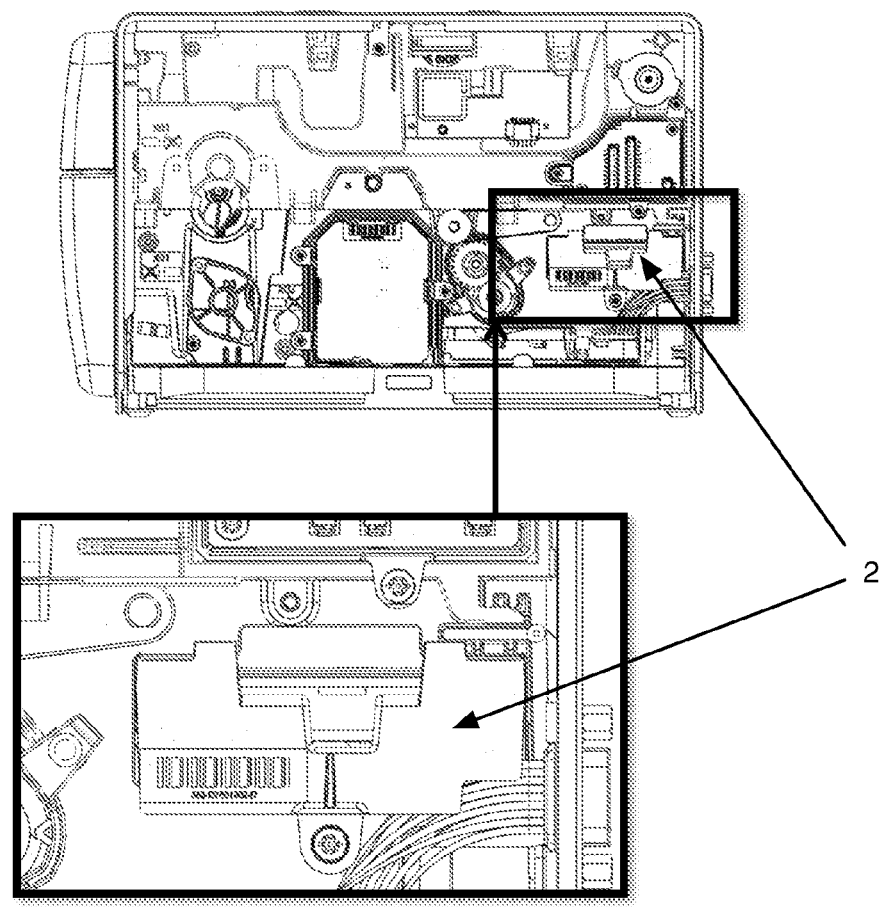
FIG. 2 shows a side view of the plastic-card printer with a contactless communication module in place on the frame of the printer.

FIG. 1 shows an example of a plastic-card printer 1. A contactless plastic-card encoding module 2 is also shown schematically in a position aligned with a recess provided in the frame of the printer. FIG. 2 shows the printer 1 when the encoding module 2 has been introduced into its recess and fixed to the frame of this printer, for example by screwing it to this frame.

Figure 3:
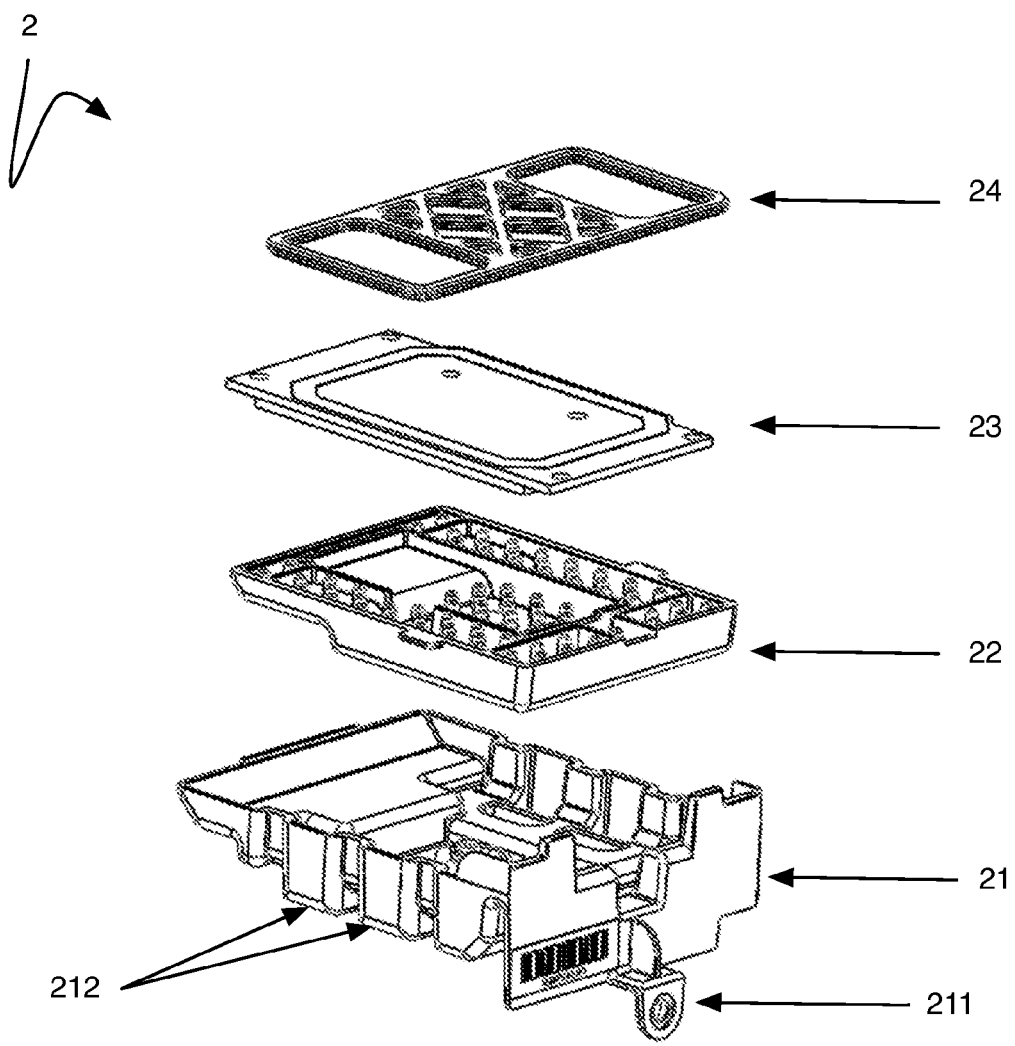
FIG. 3 shows a contactless plastic-card encoding module according to the present invention.

FIG. 3 shows a contactless plastic-card encoding module 2 according to the present invention.

This module 2 comprises an electronic card 23 that provides a plastic-card encoding function and contactless communication, for example of the RFID type, a hollow support 21 that comprises means 211 for fixing this support to the frame of the printer, for example by screwing, a means 22 made from flexible material, such as a foam, which is intended to be positioned at the bottom of the hollow support 21 and to receive the electronic card 23, and a means 24 for holding the electronic card in position on the flexible means.

According to one embodiment, the holding means 24 is an elastic, for example an SEBS elastomer, the ends of which are gripped in lugs that are secured to the support 21.

The invention claimed is:

1. A contactless plastic-card encoding module (2) mounted on the frame of a plastic-card printer (1), said module comprising an electronic card (23) that fulfils the function of plastic-card encoding, characterised in that it comprises
   - a hollow support (21) comprising fixations (211) for fixing the support to the frame of the printer,
   - a piece (22) absorbing any reliefs on the electronic card, said piece (22) being positioned at the bottom of the hollow support (21) and receiving the electronic card (23), and
   - a holder (24) for holding the electronic card in position on the piece, wherein the holder (24) is an elastic the ends of which are gripped in lugs (212) that are secured to the support (21).

2. The module according to claim 1, in which the piece is a piece of foam.

3. A plastic-card printer (1) comprising a frame and a contactless plastic-card encoding module (2) according to claim 1 fixed on said frame.

* * * * *